United States Patent
Moon

(10) Patent No.: US 7,131,742 B2
(45) Date of Patent: Nov. 7, 2006

(54) BACKLIGHT UNIT FOR LIQUID CRYSTAL DISPLAY DEVICE

(75) Inventor: Jeong Min Moon, Kyonggi-do (KR)

(73) Assignee: LG.Philips LCD Co., Ltd. (KR)

( * ) Notice: Subject to any disclaimer, the term of this patent is extended or adjusted under 35 U.S.C. 154(b) by 11 days.

(21) Appl. No.: 10/419,239

(22) Filed: Apr. 21, 2003

(65) Prior Publication Data

US 2004/0140773 A1   Jul. 22, 2004

(30) Foreign Application Priority Data

Dec. 31, 2002   (KR) .................... 10-2002-0087871

(51) Int. Cl.
*G09F 13/04* (2006.01)
(52) U.S. Cl. .................. 362/97; 362/224; 362/225; 362/236; 315/312; 315/324; 315/56; 313/241; 313/584; 313/585
(58) Field of Classification Search ............... 315/312, 315/322–324, 185 S, 56–59; 362/97, 224, 362/225, 236, 240, 647
See application file for complete search history.

(56) References Cited

U.S. PATENT DOCUMENTS 5,325,024 A    6/1994  Piejak et al. ............... 315/248
5,760,541 A    6/1998  Stavely et al. ............. 313/491
5,889,366 A    3/1999  Yokokawa et al. ......... 313/607
5,975,722 A *  11/1999 Van Duijneveldt .......... 362/296
6,674,250 B1*  1/2004  Cho et al. ................... 315/291
2003/0035283 A1* 2/2003 Lim ............................ 362/97

FOREIGN PATENT DOCUMENTS

| JP | 10-143089 | 5/1998 |
| JP | 2000-338487 | 12/2000 |
| JP | 2000-356959 | 12/2000 |
| JP | 189250/ | * 3/2003 |
| KR | 2002-0077001 A | 10/2002 |

* cited by examiner

*Primary Examiner*—Tuyet Thi Vo
(74) *Attorney, Agent, or Firm*—McKenna Long & Aldridge LLP

(57) ABSTRACT

A backlight unit for a liquid crystal display device includes a plurality of lamps alternately arranged on at least two regions of a light emission surface, wherein each lamp has a length substantially shorter than that of the light emission surface, first, second, and third supports spaced apart from one another, wherein each support has a matching shape for mounting the lamps, a bottom support supporting the first, second, and third supports, and first, second, and third common electrodes respectively attached on the first, second, and third supports.

24 Claims, 8 Drawing Sheets

BACKLIGHT UNIT FOR LIQUID CRYSTAL DISPLAY DEVICE

This application claims the benefit of the Korean Application No. P2002-087871 filed on Dec. 31, 2002, which is hereby incorporated by reference.

BACKGROUND OF THE INVENTION

1. Field of the Invention

The present invention relates to a backlight unit, and more particularly, to a backlight unit for a liquid crystal display device. Although the present invention is suitable for a wide scope of applications, it is particularly suitable for improving an efficiency of lamps and permitting a better wiring arrangement for the lamps.

2. Discussion of the Related Art

A cathode ray tube (CRT), mostly used for monitors for TV receivers, measuring instruments, information terminals, and so on, cannot satisfy the requirements for reducing size and weight of electronic products due to heavy weight and hefty size.

Thus, the size and the weight of the CRT have certain limitations in the trend of compact size and light weight of electronic products.

The devices that are expected to replace the CRTs include liquid crystal displays (LCD) using an electro-optical effect, plasma display panels (PDP) using gaseous discharge, electro-luminescence (EL) displays using an electro-luminescence effect, and the like. Among the above devices, researches on the LCD are the most active.

For replacing the CRTs, the LCDs have been actively developed for reducing size, weight, and power consumption of displays. Recently, they are fully developed for monitors in laptop computers, monitors in desktop computers, and large-sized information displays.

Most of the LCDs are light receiving devices in which the control of light provided from the outside of the device is required for displaying a picture. Thus, a separate light source for providing light to the LCD panel (i.e., a backlight unit) is required.

In general, the backlight unit used as a light source of the LCD is comprised of cylindrical lamps of an edge light type or a direct type.

In the edge light type, a lamp unit is placed at a side of the light plate, which guides the light. The lamp unit is provided with a lamp for emitting the light, and lamp holders inserted in both sides of the lamp for protection of the lamp. A lamp reflecting plate is inserted in a side surface of the light plate to surround the outside surface of the lamp for reflecting the light from the lamp toward the light plate.

The edge light type having the lamp unit provided to a side surface of the light plate has been employed in relatively small-sized LCDs, such as laptop computers and desktop computers. The edge light type has a good uniformity of light and a long lifetime, and has an advantage in fabricating thin LCDs.

On the other hand, the direct type has been developed mainly for the size of an LCD greater than 20". The direct type is provided with a plurality of lamps arranged in line under a diffuse plate for directing the light to a front surface of the LCD panel, directly.

Since the direct type has a light utilization efficiency higher than the edge light type, the direct type is employed in large-sized LCDs.

A related art backlight unit will be described with reference to the attached drawings.

FIG. 1 illustrates a perspective view of a direct type backlight unit according to a related art. FIG. 2 illustrates a plane view of a lamp arrangement of the direct type backlight unit of FIG. 1. FIG. 3 illustrates a rear view of a backlight unit having inverters for applying an electrical signal to the lamps in FIG. 2. FIG. 4 illustrates a plane view of another related art lamp arrangement of a backlight unit.

Referring to FIGS. 1 and 2, the related art backlight unit is provided with a plurality of lamps 1, an outside case 3 for holding and supporting the lamps 1, and light scattering means 5a, 5b, and 5c between the lamps 1 and an LCD panel (not shown).

The light scattering means 5a, 5b, and 5c is provided with a plurality of diffusion sheets and diffusion plates between the lamps 1 and the LCD panel for enhancing a light scattering effect to prevent the lamps from appearing on the screen of the LCD and provide a uniform luminance distribution.

There is a reflection plate 7 on an inside surface of the outside case 3 for directing the light from the lamps 1 to the display part of the LCD panel for maximizing a light utilization efficiency.

The lamp 1 is a cold cathode fluorescent lamp (CCFL) provided with electrode parts 2a and 2b at the opposite ends of the inside of a tube, each connected to a power line 9a or 9b. The opposite ends of the lamp 1 are inserted in holes formed in the opposite surfaces of the outside case 3.

When a voltage is provided to the electrode parts 2a and 2b through the power lines 9a and 9b, each lamp 1 emits the light. The voltage provided to the power lines is supplied from an inverter 30 provided in one side portion of the back of the outside case 3, as shown in FIG. 3.

In the power lines 9a and 9b, there are a high voltage power line 31 and a low voltage power line 32 depending on voltages provided thereto. That is, the high voltage power line 31 and the low voltage power line 32 from the opposite ends of the lamp 1 are connected to each terminal of the inverter 30 connector for receiving voltages.

For minimizing electrical influences to the LCD panel and external device, the length of the high voltage power line 31 should be shorter than that of the low voltage power line 32.

In the direct type backlight unit of the related art, the length of the lamp 1 is substantially equal to that of the front light emission surface of the backlight unit. Therefore, the larger the size of the light emission surface, the longer the length of the lamp 1. For example, currently the LCD with the size over 30" to 40" requires a length of the lamp longer than 700 mm.

Thus, when the lamp is too long, fabrication of the lamp becomes more difficult. In addition, assembly of the lamp with the backlight unit becomes complicated, and the unit is susceptible to the external impact. Moreover, a luminance of the lamp becomes not uniform, and the problem of picture quality deterioration (EMI: electro magnetic interference) occurs due to instability and the electric influence from the driving circuit of the LCD. This is because a high turn-on voltage and a sustain voltage are required.

Due to such a problem, in some of the direct type backlight units, the lamps 40 are arranged in the vertical direction from the light emission surface. Similarly, the electrode parts 42a and 42b are provided at the opposite ends of an inside of a tube of the lamp 40, and the power lines 43a and 43b are connected to the electrode parts 42a and 42b, respectively. The reference numeral '41' denotes a reflection plate.

However, the arrangement of the lamps 40 in the vertical direction of the light emission surface causes mercury in the tube of the lamp 40 to move to the bottom thereof, thereby deteriorating performance of the lamp 40 when the backlight unit is used for a long time.

SUMMARY OF THE INVENTION

Accordingly, the present invention is directed to a backlight unit for a liquid crystal display device that substantially obviates one or more of problems due to limitations and disadvantages of the related art.

Another object of the present invention is to provide a backlight unit for a liquid crystal display device, which can improve an efficiency of a lamp and permits an effective wiring arrangement for the lamps.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a backlight unit for a liquid crystal display device includes a plurality of lamps alternately arranged on at least two regions of a light emission surface, wherein each lamp has a length substantially shorter than that of the light emission surface, first, second, and third supports spaced apart from one another, wherein each support has a shape for mounting the lamps, a bottom support supporting the first, second, and third supports, and first, second, and third common electrodes respectively attached on the first, second, and third supports.

In another aspect of the present invention, a backlight unit for a liquid crystal display device includes a plurality of lamps alternately arranged on at least two regions of a light emission surface, wherein each lamp has a length substantially shorter than that of the light emission surface, and the lamps have first and second external electrodes at both ends, and at least three common electrodes connecting the first and second external electrodes of the lamps.

In a further aspect of the present invention, a backlight unit for a liquid crystal display device includes a plurality of lamps alternately arranged on at least two regions of a light emission surface, wherein each lamp has a length substantially shorter than that of the light emission surface, first, second, third, and fourth supports spaced apart from one another, wherein each support has a shape for mounting the lamps, a bottom support supporting the first, second, third, and fourth supports, first, second, third, and fourth common electrodes respectively attached on the first, second, third, and fourth supports, and at least one power supply driving the lamps.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

The present invention includes an alternate arrangement of a plurality of lamps, each having a length shorter than that of the light emission surface of a backlight unit, an arrangement of a common electrode commonly for connecting the external electrodes of the lamps arranged on the inside, and a structure for holding the lamps arranged inside of a backlight unit.

The backlight unit of the present invention will be described with reference to the attached drawings.

Figure 1:
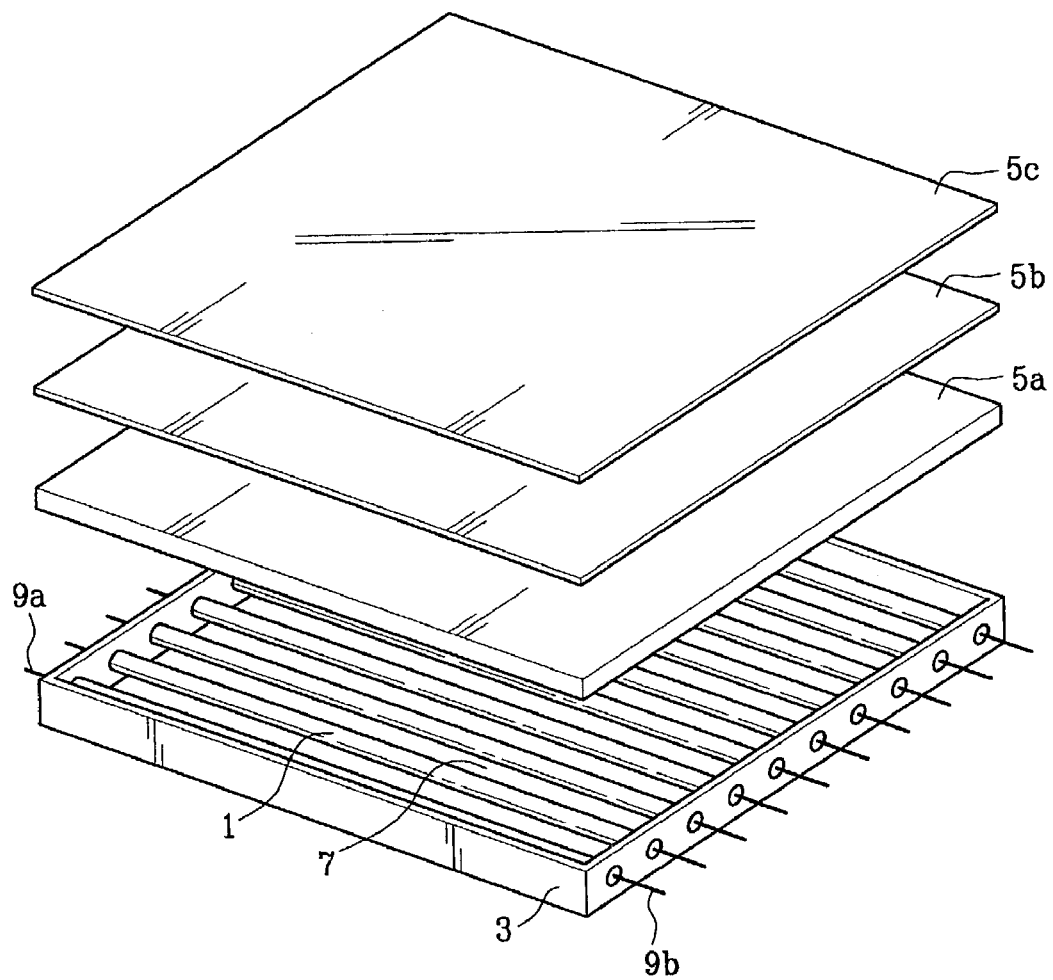
FIG. 1 illustrates a perspective view of a direct type backlight unit according to a related art.
Figure 2:
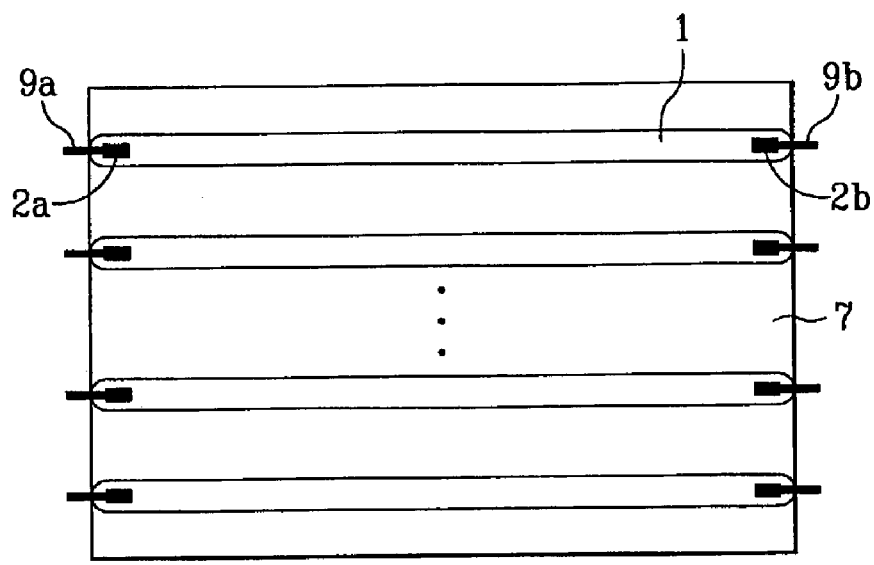
FIG. 2 illustrates a plane view of a lamp arrangement of the direct type backlight unit of FIG. 1.
Figure 3:
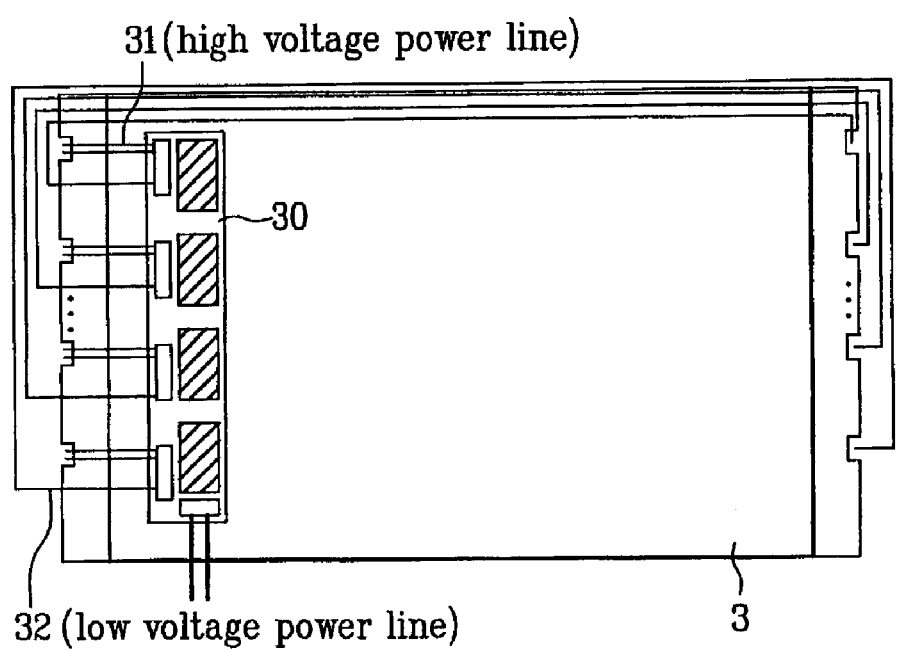
FIG. 3 illustrates a rear view of a backlight unit having inverters for applying an electrical signal to the lamps in FIG. 2.
Figure 4:
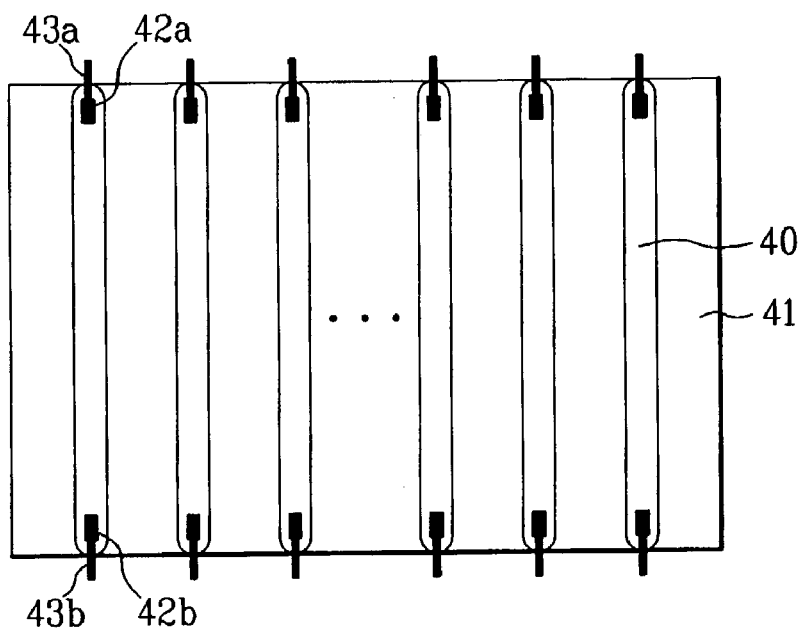
FIG. 4 illustrates a plane view of another related art lamp arrangement of a backlight unit.
Figure 5:
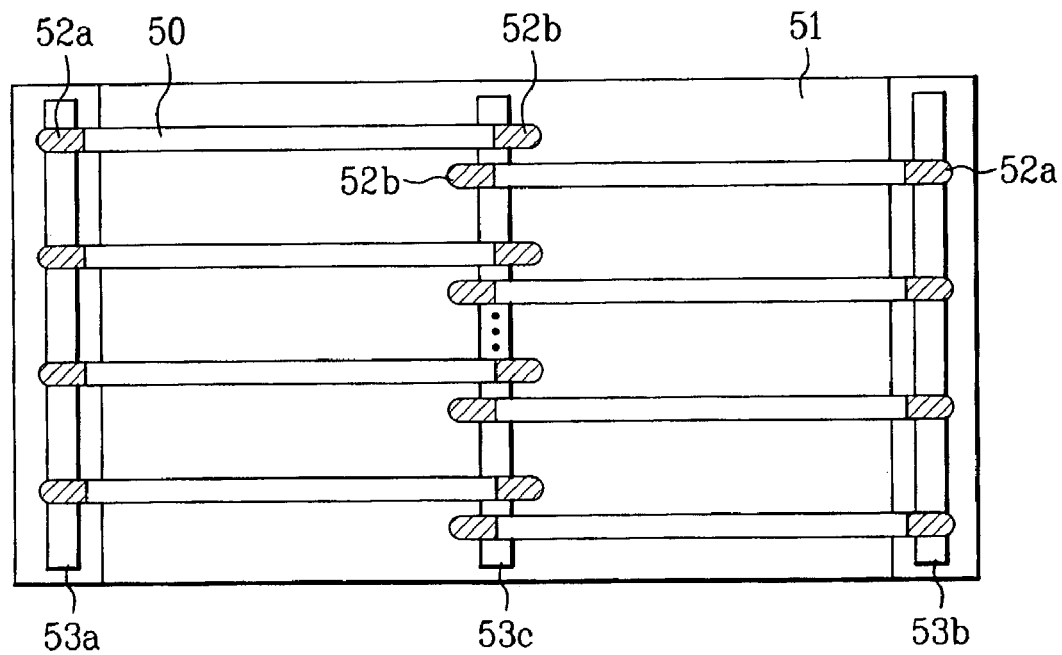
FIG. 5 illustrates a plane view of a lamp arrangement according to the present invention.

Referring to FIG. 5, the backlight unit of the present invention includes a plurality of lamps 50 each having first and second external electrodes 52a and 52b at the opposite ends of the outside of a tube arranged alternately in left and right sides of the entire light emission surface of the backlight unit to divide the length of the entire light emission surface into two parts.

The first and second external electrodes 52a and 52b of the lamps 50 arranged in the same part are connected to the common electrode. As shown in FIG. 5, first to third common electrodes 53a, 53b, and 53c are arranged in one direction.

The first external electrodes 52a of the lamps 50 arranged on the left side are commonly connected to the first common electrode 53a, and the second external electrodes 52b of the lamps 50 arranged in the left side is commonly connected to the third common electrode 53c. The first external electrodes 52a of the lamps 50 arranged on the right side is commonly connected to a second common electrode 53b, and the second external electrodes 52b of the lamps 50 arranged on the right side are commonly connected to the third common electrode 53c.

A reference numeral 51 is a reflection plate.

It is required that the longer the length of a display screen of an LCD panel, the longer the length of a lamp. This is because the length of a light emission surface of the backlight unit should be longer. Also, it is required that the longer the length of the lamp, the higher a tube voltage to be provided to the lamp.

In order to improve the above features, each lamp 50 must have a length shorter (approximately ½) than the length of the light emission surface are alternatively located on the left and right sides of the light emission surface with respect to the equally divided line (i.e., an imaginary line).

In this instance, as shown in FIG. 5, the lamps 50 may be arranged in the central part such that the first and second electrodes 52a and 52b are alternately arranged on a straight line (not shown).

As described, the lamps 50 are an external electrode fluorescent lamp (EEFL) having the first and second external electrodes at the opposite ends of the outside of the tube.

Embodiments of the backlight unit of the present invention having such lamps arranged as above will be described as follows.

Figure 6:
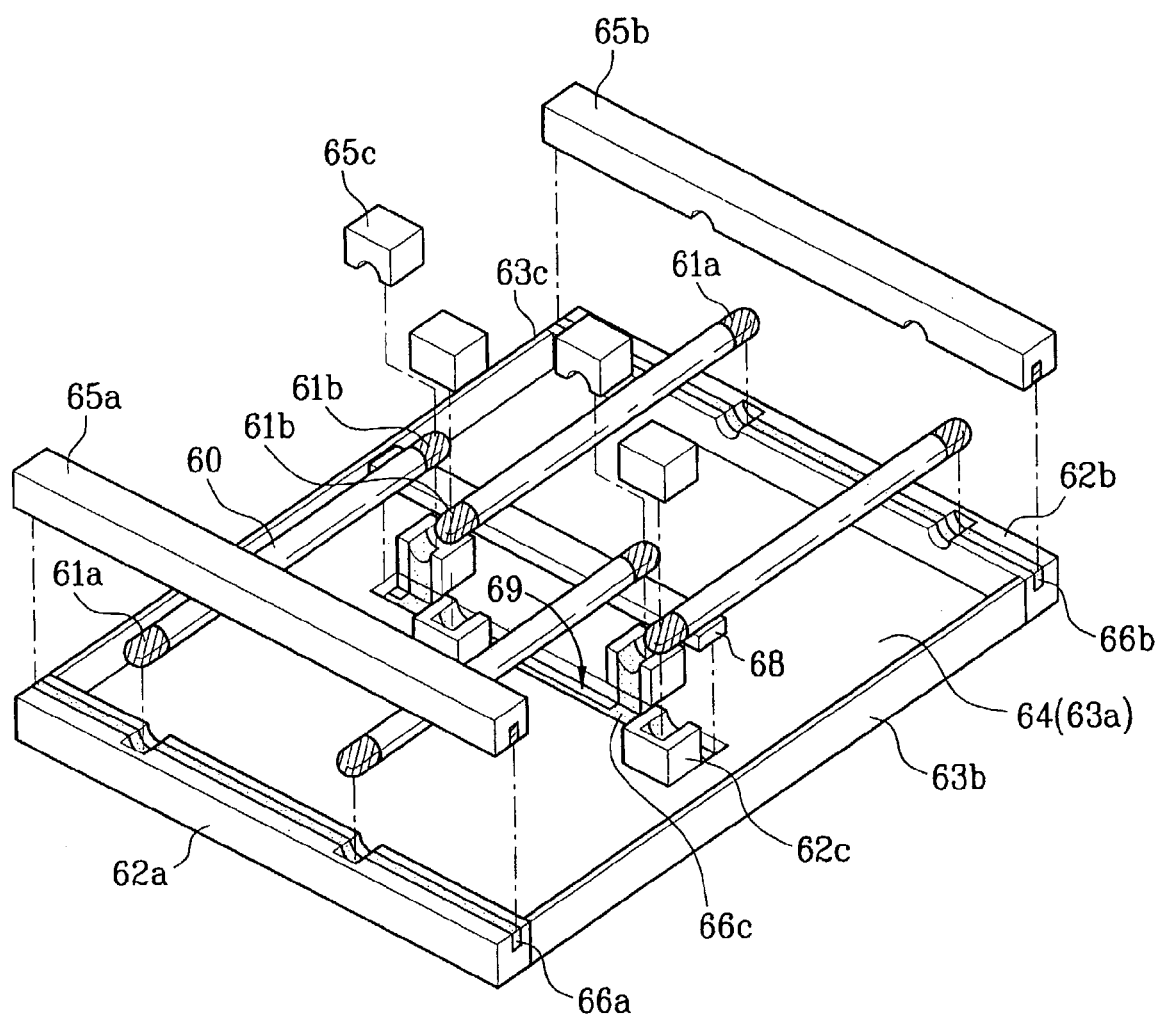
FIG. 6 illustrates an expanded perspective view of a backlight unit in accordance with a first embodiment of the present invention.
Figure 7:
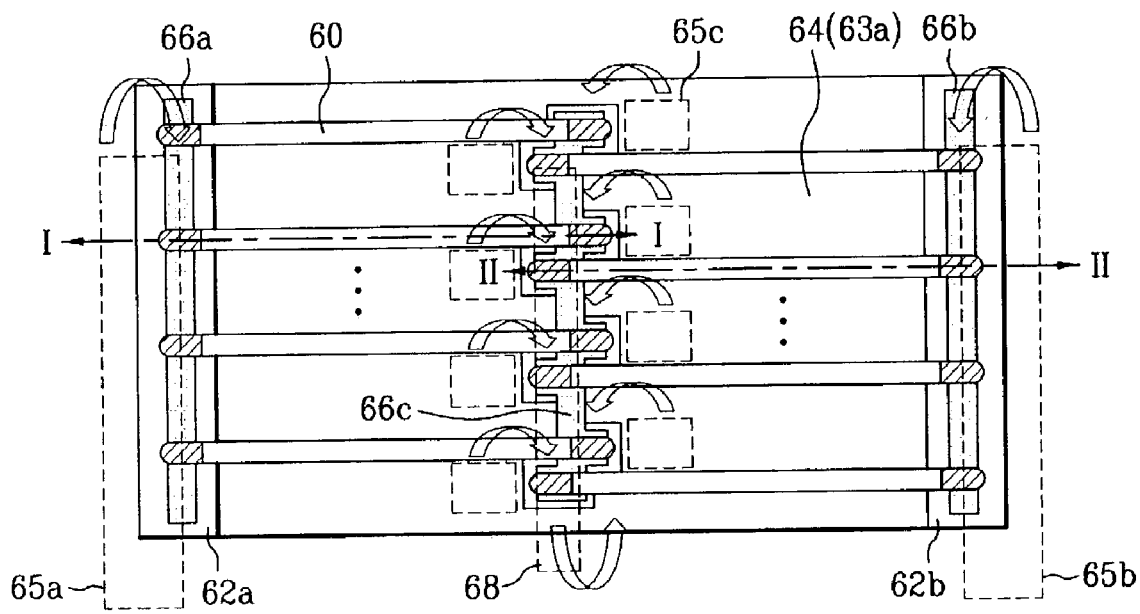
FIG. 7 illustrates a plane view of the backlight unit in accordance with the first embodiment of the present invention.
Figure 8:
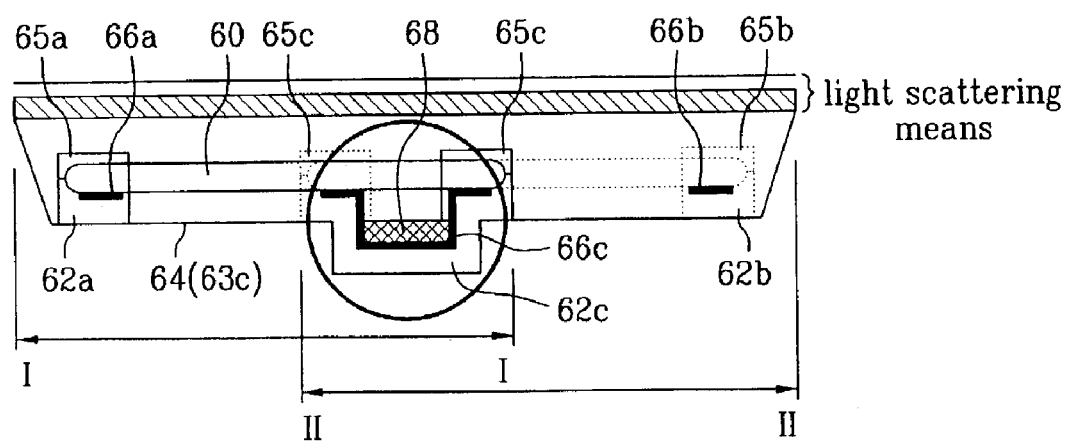
FIG. 8 illustrates a cross-sectional view taken along lines I—I and II—II of FIG. 7.
Figure 9:
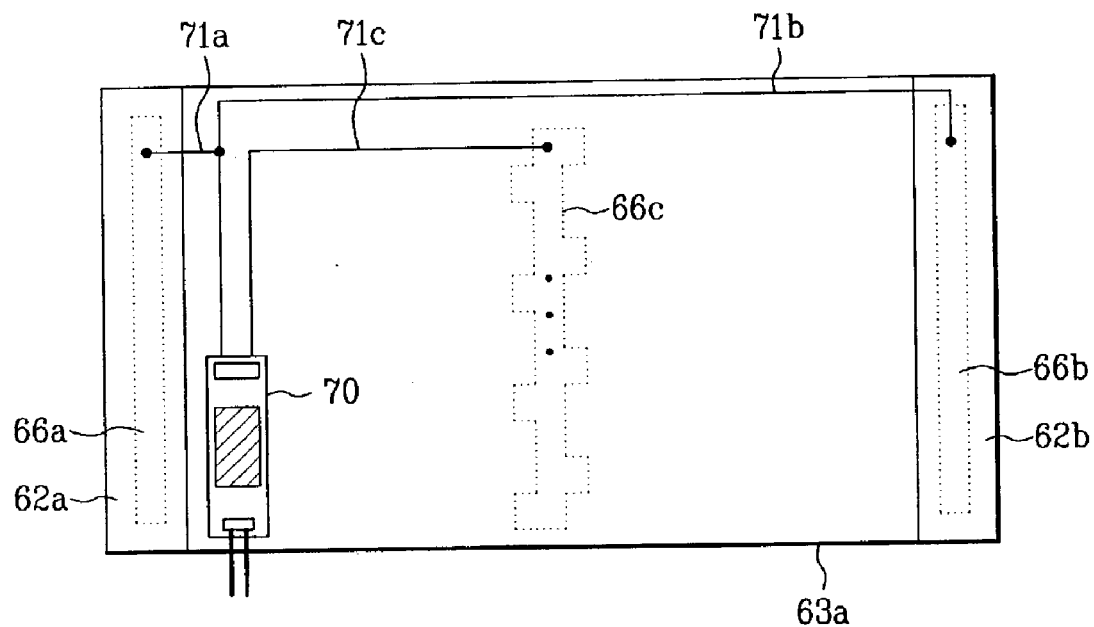
FIG. 9 illustrates a rear view illustrating electrical connections and arrangements of lamps and a lamp operating device (inverters) applied to the first embodiment of the present invention.

FIG. 6 illustrates an expanded perspective view of a backlight unit in accordance with a first embodiment of the present invention. FIG. 7 illustrates a plane view of the backlight unit in accordance with the first embodiment of the present invention. FIG. 8 illustrates a cross-sectional view taken along lines I—I and II—II of FIG. 7. FIG. 9 illustrates a rear view illustrating electrical connections and arrangements of lamps and a lamp-driving device (i.e., inverter 70) applied to the first embodiment of the present invention.

Referring to FIGS. 6, 7, and 8, a direct type backlight unit of the present invention includes a plurality of lamps 60, first, second, and third lower parts 62a, 62b, and 62c, a bottom support 63a, side supports 63b and 63c, a reflection plate 64, first, second, and third upper parts 65a, 65b, and 65c, first to third common electrodes 66a, 66b, and 66c, and an electrode insulating layer 68. Each pair of the first lower and upper parts 62a and 65a, the second lower and upper parts 62b and 65b, and the third lower and upper parts 62c and 65c holds the lamps 60 and acts as first, second and third supports.

The lamps 60 are arranged on the left and right sides alternately dividing the length of the entire light emission surface into two parts of EEFL with first and second external electrodes 61a and 61b at the opposite ends.

The first and second lower parts 62a and 62b have a length the same with the length of the entire light emission surface, and are spaced apart from each other. The bottom support 63a and the side supports 63b and 63c are formed at the bottom and side spaces defined by the first and second lower parts 62a and 62b, as a unit with the first and second lower parts 62a and 62b.

There is a hole 69 in the central part the bottom support 63a where the lamps 50 are alternately arranged. The third lower part 62c is formed over the hole 69 and on the reflection plate 64 at both sides and has a groove corresponding to the hole 69. The third lower part 62c has one part projected to have the same height as other lower parts with a lamp-shaped groove for holding the both ends of the lamps 60, and the other part is passed through the hole 69. The other part of the third lower part 62c projected from the bottom surface of the backlight unit has a recess for receiving the lamp.

The first and second upper parts 65a and 65b are spaced apart from each other with the same distance, and arranged over the first and second lower parts 62a and 62b to support and hold the lamps 60 with the first and second lower parts 62a and 62b. The first and second lower parts 62a and 62b and the first and second upper parts 65a and 65b have a plurality of grooves for receiving both ends of the plurality of lamps 60.

The reflection plate 64, formed of a good light reflective material, such as a plastic, is provided to inside surfaces of the first and second lower parts 62a and 62b, the bottom support 63a, and the side supports 63b and 63c. Although not shown in the drawings, the reflection plate 64 may be formed by coating an additional reflective material on the inside surfaces of the first and second lower parts 62a and 62b, the bottom support 63a, and the side supports 63b and 63c. The reflection plate 64 is required for directing the light from the lamps 60 toward the LCD panel to utilize the light effectively.

The first and second common electrodes 66a and 66b are respectively formed along the surfaces of the first and second lower parts 62a and 62b, which having a groove to commonly supply the power to each first external electrode 61a of the lamps 60. The first and second common electrodes 66a and 66b may be formed along the surface of the first and second upper parts 65a and 65b, which having a groove therein. The third common electrode 66c is formed along the top, side and bottom surfaces of the third lower part 62c to commonly supply the power to the each second external electrode 61b of the lamps 60.

The electrode insulating layer 68 is formed along the groove of the third lower part 62c, arranged to have the same height as that of the reflection plate 64, and formed of a reflective material. The electrode insulating layer 68 is provided for preventing the third common electrode 66c from being varied in the luminance of the backlight unit when it contacts the reflection plate 64.

The rectangles in dashed lines in FIG. 7 denote the first, second, and third upper parts 65a, 65b, and 65c.

Referring to FIG. 8, at the upper portion of the foregoing structure, there is a light scattering means provided with a plurality of diffusion sheets, diffusion plates, and the like, between the lamps 60 and the LCD panel for enhancing a light scattering effect to prevent the lamps from appearing on a display screen of the LCD panel and providing a uniform luminance distribution.

Upon application of a voltage to the first, second, and third common electrodes 66a, 66b, and 66c, the backlight unit is operated as the lamps 60 emitting light. The first and second common electrodes are supplied with the same voltage and the third common electrode is supplied with a different voltage from the first and second common electrodes. For example, the voltage different is about 800 to 1200 V.

Referring to FIG. 9, the voltage applied to the first, second, and third common electrodes 66a, 66b, and 66c is supplied from an output part of an inverter 70 provided in a region of the back surface of the bottom support 63a.

The first, second, and third common electrodes 66a, 66b, and 66c are connected to the output part of the inverter 70, as first, second, and third electrode connection lines 71a, 71b, and 71c pass through a portion of the bottom surface and connect the output part of the inverter 70.

The first and second electrode connection lines 71a and 71b connected to the first and second common electrodes 66a and 66b are commonly connected to one output terminal of the inverter 70, to apply the same signal thereto, and the third electrode connection line 71c connected to the third common electrode 66c is connected to the other output terminal of the inverter 70.

Figure 10:
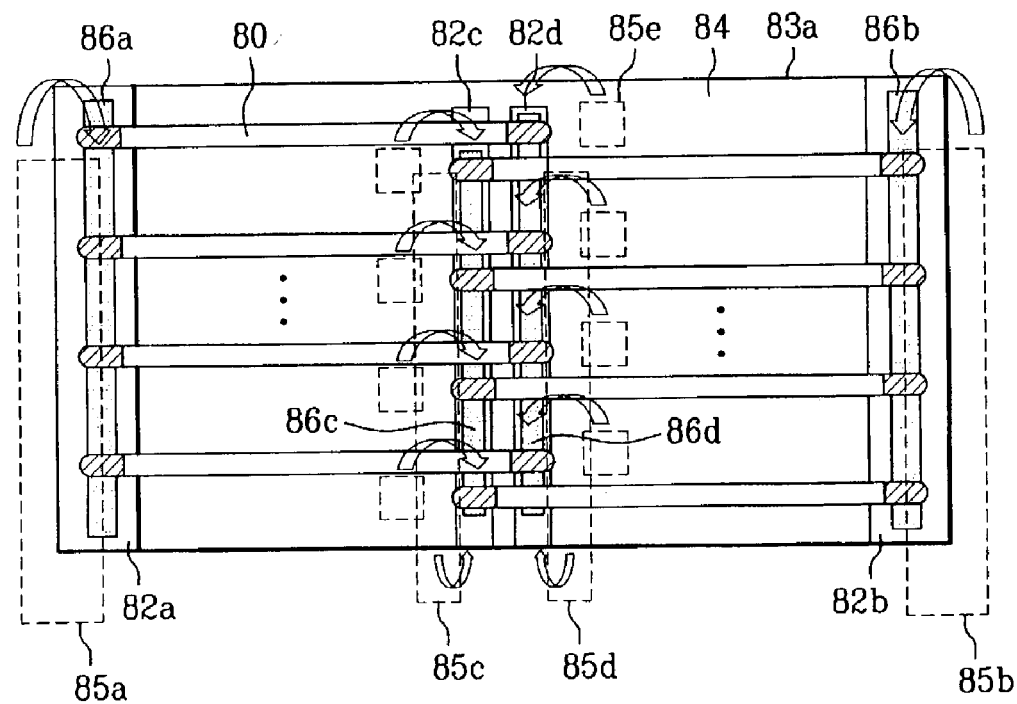
FIG. 10 illustrates a plane view of a backlight unit in accordance with a second embodiment of the present invention.
Figure 11:
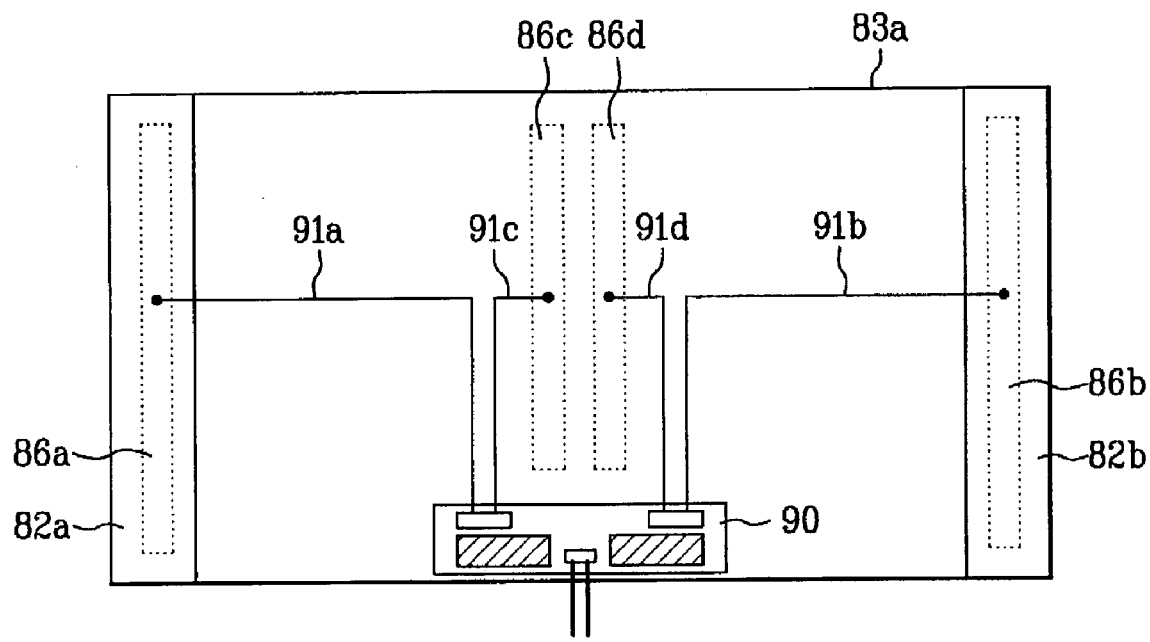
FIG. 11 illustrates a rear view illustrating an electrical connection and an arrangement of an example of lamps and a lamp operating device (i.e., inverters) applied to the second embodiment of the present invention.
Figure 12:
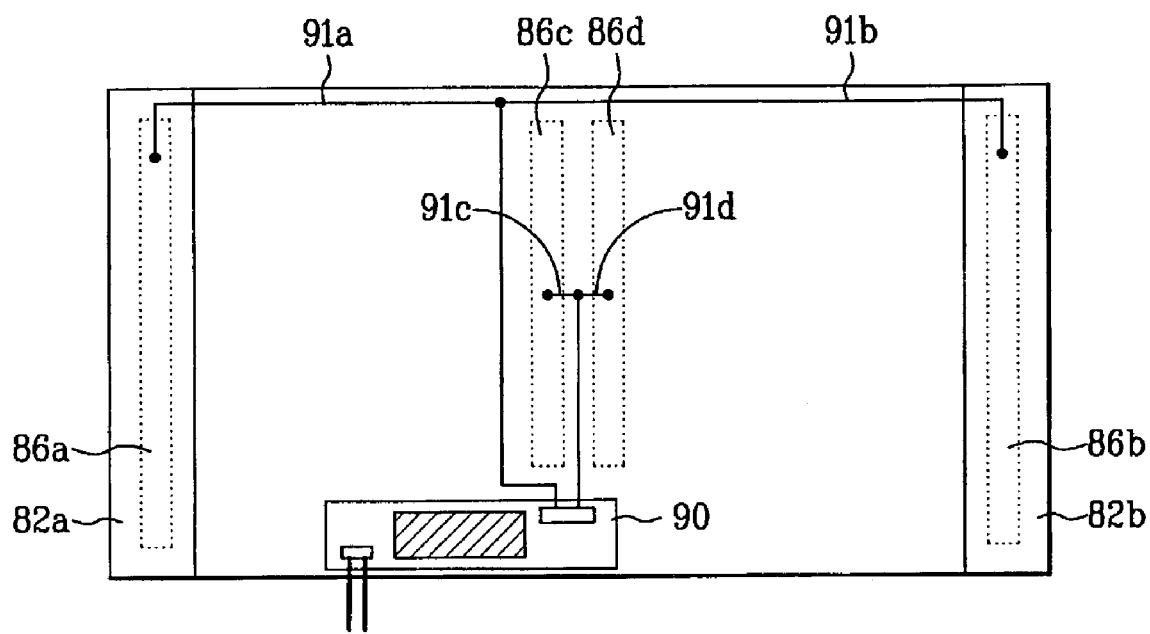
FIG. 12 illustrates a rear view illustrating an electrical connection and an arrangement of a second example of lamps and a lamp operating device (i.e., inverters) applied to the second embodiment of the present invention.

FIG. 10 illustrates a plane view of a backlight unit in accordance with a second embodiment of the present invention. FIG. 11 illustrates a rear view illustrating an electrical connection and an arrangement of an example of lamps and a lamp-driving device (i.e., inverter 90) applied to the second embodiment of the present invention. FIG. 12 illustrates a rear view illustrating an electrical connection and an arrangement of a second example of lamps and a lamp-driving device applied to the second embodiment of the present invention.

Referring to FIG. 10, the second embodiment of the backlight unit according to the present invention is similar to the first embodiment except that both ends of the lamps 80 arranged alternately in the central part are connected to two common electrodes with the both ends divided into two parts, and the third lower part is changed accordingly.

That is, the third and fourth common electrodes 86c and 86d are isolated and arranged in one direction such that both ends of lamps arranged on the same line are connected to one another among the first and second external electrodes at both ends of the lamps 80 arranged in the central part of the bottom support 83a. Thus, an identical effect is provided depending on the electrical connection system at the last terminal.

The third and fourth common electrodes 86c and 86d are arranged on the top surface of the third and fourth lower parts 82c and 82d formed spaced apart in the central part of the bottom support 83a. There are a plurality of holes in the bottom support 83a for fitting the third and fourth lower parts 82c and 82d. A part where the lamp 80 is fixed is projected while a part where no lamp 80 is held is passed through the hole and projected from the back surface of the bottom support 83a.

The third and fourth lower parts 82c and 82d have a curvature having upper projections and back surface projections at a constant interval. The third and fourth lower parts 82c and 82d projected from the back surface of the bottom support 83a have a plurality of recesses. Accordingly, the third and fourth common electrodes 86c and 86d have a curvature along the top surface of the third and fourth lower parts 82c and 82d.

The third and fourth lower parts 82c and 82d are provided with the recesses for an electrical isolation from the reflection plate on the bottom support 83a. In this instance, a plurality of the third and fourth lower parts 82c and 82d may be formed in one direction isolated from one another each having a groove in the top surface for receiving the lamp without holes in the bottom support 83a.

Referring to FIG. 11, in the backlight unit of the present invention having the third and fourth common electrodes 86c and 86d in the central part thereof, when a voltage is applied to the first, second, third, and fourth common electrodes 86a, 86b, 86c, and 86d, the lamps 80 emit light.

As shown in FIG. 11, a voltage to the first, second, third, and fourth common electrodes 86a, 86b, 86c, and 86d is supplied from first and second output parts of the inverter 90 provided to a region of the back surface of the bottom support 83a. The first, second, third, and fourth common electrodes 86a, 86b, 86c, and 86d are sorted and connected to the first and second output parts as first to fourth electrode connection lines 91a, 91b, 91c, and 91d pass through a portion of the bottom surface and sorted and connected to the first and second output parts of the inverter 90.

In this instance, the first and third electrode connection lines 91a and 91c are respectively connected to the terminals of the first output part, and the second and fourth electrode connection lines 91b and 91d are connected to the terminals of the second output part of the inverter 90.

The rectangles in dashed lines in FIG. 10 denote the first to fifth upper parts 85a, 85b, 85c, 85d, and 85e.

An electrode connection of the backlight unit connected by another method will be described as follows.

Referring to FIG. 12, a voltage is supplied to the first, second, third, and fourth common electrodes 86a, 86b, 86c, and 86d from the output part of the inverter 90 in one region of the back surface of the bottom support 83a.

The first, second, third, and fourth common electrodes 86a, 86b, 86c, and 86d are connected to the output part of the inverter 90 as the first to fourth electrode connection lines 91a, 91b, 91c, and 91d pass through a portion of the bottom surface and connected to the output part of the inverter 90. In this instance, the first and second electrode connection lines 91a and 91b are commonly connected to one terminal of the output part of the inverter 90, and the third and fourth electrode connection lines 91c and 91d are connected to the other terminal of the output part of the inverter 90.

Figure 13:
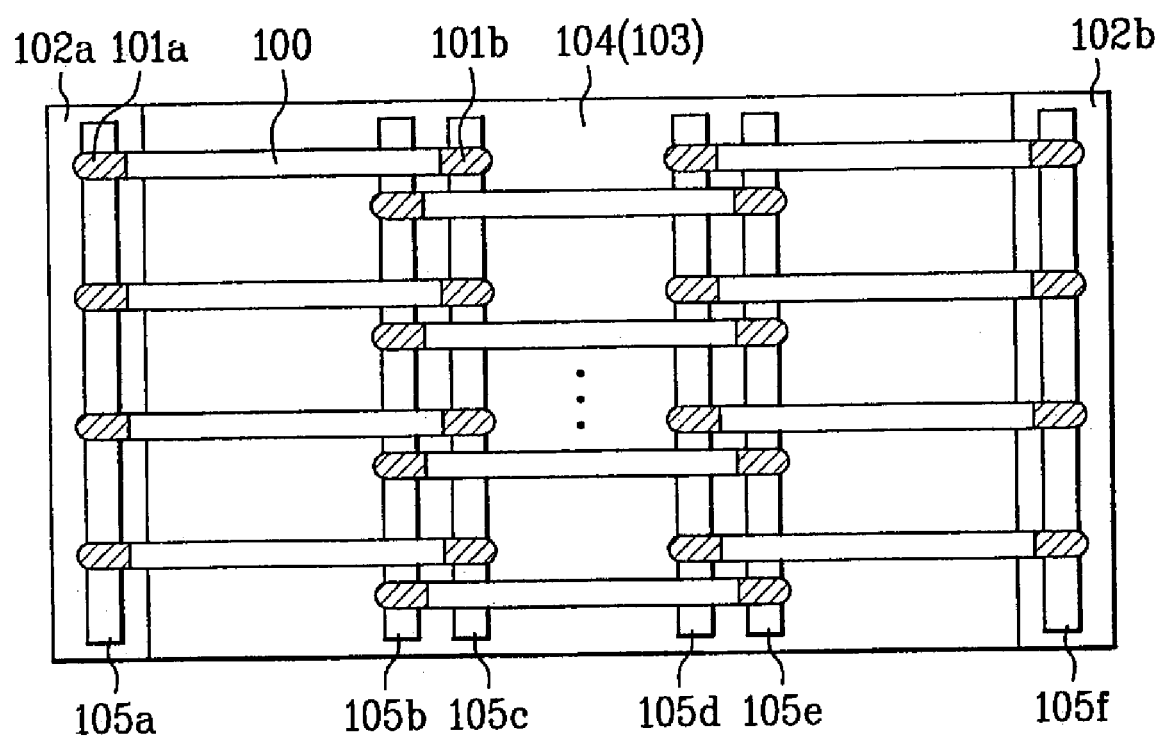
FIG. 13 illustrates a rear view illustrating another arrangement of lamps to be applied to the embodiments of the present invention.

Next, a system of the backlight unit having lamps arranged by other method provided for applying to the first and second embodiments of the present invention will be described. FIG. 13 illustrates a rear view illustrating another arrangement of lamps to be applied to the embodiments of the present invention. In the third embodiment, the entire light emission surface is equally divided by three regions, and the lamps 100 are alternately arranged in the equally divided regions.

Referring to FIG. 13, a backlight unit includes a plurality of lamps 100 each having first and second external electrodes 101a and 101b inside of both ends of a tube arranged on the left/central/right sides of the entire light emission surface of the backlight unit which equally divide a length of the entire light emission surface into three regions, first and second lower parts 102a and 102b for holding the lamps 100, a bottom support 103 formed on the bottom surface of a space defined by the first and second lower parts 102a and 102b, a reflection plate 104 arranged such that the light from the lamps 100 on the inside surface of the bottom support 103 are directed to a display part of the LCD panel, first to sixth common electrodes 105a to 105f arranged so as to connect the external electrodes at both ends of the lamps 100 on the same line, and light scattering means (not shown) arranged between the lamps 100 and the LCD panel (not shown).

Similarly, the common electrodes are sorted and arranged in a part where the external electrodes of the lamps 100 are alternately arranged on the inside of the bottom support 103 so that the first and second external electrodes arranged on the same line are connected to the same common electrode. Although not shown in the drawing, similar to the first embodiment, only one common electrode line may be arranged in a part where the lamps 100 are alternately arranged. Even when the lamps are arranged in the three equally divided regions, other structures are similar to those of the first and second embodiments.

Thus, when the length of the display screen of the LCD panel becomes longer, the length of the light emission surface of the backlight unit also becomes longer, and the length of the lamp 100 should be longer. If the lamp 100 is longer, a tube voltage to be applied to the lamp 100 is required to be higher. For improving this problem, lamps each with an approximately ⅓ length of the light emission surface are provided, and arranged on the left/central/right sides of the light emission surface, respectively.

In this instance, as shown in FIG. 13, the lamps 100 may be arranged such that the first and second external electrodes 101a and 101b are alternately arranged on the three equally dividing lines to have a zigzag form or on straight lines (not shown).

In the present invention, as an example, the arrangement of the lamps in which the entire light emission surface is divided into three regions, and the lamps are alternately arranged in the equally divided regions. However, the length of the light emission surface may be equally divided by 'n' (wherein n is a natural number), and the lamps are alternately arranged thereon.

In the case that the light emission surface of the backlight unit is equally divided into 'n', and the lamps are arranged thereon, the backlight unit includes a plurality of lamps alternately arranged on each of regions obtained by equally dividing the entire light emission surface of the backlight unit by 'n', first and second upper and lower parts arranged opposite to one another at a fixed interval, each having a form capable of receiving both ends of the lamps, a bottom support arranged in a space defined by the first and second lower parts, a plurality of central lower parts, each having a form capable of receiving both end electrodes of the lamp in a part where the lamps are alternately arranged, a plurality of supports each for receiving both ends of the alternately arranged lamps, first and second common electrodes formed on the top surfaces of the first and second lower parts in one direction, a plurality of central common electrodes formed along the top surfaces of the central lower parts, and a plurality of electrode insulating layers formed on the central lower parts to cover a portion of the central common electrodes.

The central common electrode may be divided into two lines for separately receiving both end electrodes of the lamps arranged on the same line at the region where the lamps are alternately arranged.

The lamps 100 having a shortened length permits to reduce a sustain voltage (i.e., tube voltage) of the lamps, and improve non-uniform distribution of luminance of the entire screen.

As described above, the backlight unit of the present invention has the following advantages.

First of all, since an electrical connection of the external electrodes of the lamps is simplified, electrical characteristics of the backlight unit can be stable.

Also, since relatively short lamps can be used in fabricating large sized displays, the lamps can be used regardless of the size of displays.

Moreover, since more than two external electrode lamps can be connected to a single inverter, the backlight unit structure can be simplified, and productivity and market competitiveness are improved.

Finally, the length of the lamps can be reduced, optimum lamp operation conditions (i.e., starting voltage and operating voltage) can be less restrictive. Also, deterioration in picture quality due to an electrical influence from the driving circuit of the LCD panel can be reduced.

It will be apparent to those skilled in the art that various modifications and variations can be made in the backlight unit for a liquid crystal display device of the present invention without departing from the spirit or scope of the inventions. Thus, it is intended that the present invention covers the modifications and variations of this invention provided they come within the scope of the appended claims and their equivalents.

What is claimed is:

1. A backlight unit for a liquid crystal display device, comprising:
    a plurality of lamps alternately arranged on at least two regions of a light emission surface, wherein each lamp has a length substantially shorter than that of the light emission surface;
    first, second, and third supports spaced apart from one another, wherein each support has a shape for mounting the lamps;
    a bottom support supporting the first, second, and third supports; and
    first, second, and third common electrodes respectively attached on the first, second, and third supports, wherein the first and second common electrodes are commonly connected to an output terminal of a lamp-driving device, and the third common electrode is connected to another output terminal of the lamp-driving device;
    wherein the third support includes a reflective electrode insulating layer between the third support and one of the plurality of lamps.

2. The backlight unit of claim 1, wherein the third common electrode commonly connects one end of each of the alternately arranged lamps.

3. The backlight unit of claim 1, wherein the arranged lamps have at least one overlapped portion.

4. The backlight unit of claim 1, wherein the bottom support includes a reflection plate.

5. The backlight unit of claim 1, wherein the first and second common electrodes are applied with a first voltage, and the third common electrode is applied with a second voltage.

6. The backlight unit of claim 5, wherein the first and second voltages are different from each other.

7. The backlight unit of claim 6, wherein the first and second voltages have a voltage difference of about 800 to 1200 V.

8. A backlight unit for a liquid crystal display device, comprising:
    a plurality of lamps alternately arranged on at least two regions of a light emission surface, wherein each lamp has a length substantially shorter than that of the light emission surface;
    first, second, and third supports spaced apart from one another, wherein each support has a shape for mounting the lamps;
    a bottom support supporting the first, second, and third supports; and
    first, second, and third common electrodes respectively attached on the first, second, and third supports, wherein the third common electrode has a portion located lower than an upper surface of the bottom support.

9. The backlight unit of claim 8, further comprising an insulating layer covering the portion of the third common electrode.

10. A backlight unit for a liquid crystal display device, comprising:
- a plurality of lamps alternately arranged on at least two regions of a light emission surface, wherein each lamp has a length substantially shorter than that of the light emission surface, and the lamps have first and second external electrodes at both ends;
- at least three common electrodes connecting the first and second external electrodes of the lamps, wherein a first and a second of the at least three common electrodes are commonly connected to an output terminal of a lamp-driving device, and a third of the at least three common electrodes is connected to another output terminal of the lamp-driving; and
- a reflective electrode insulating layer extending under the third of the at least three common electrodes and between the third electrod and one of the plurality of lamps.

11. The backlight unit of claim 10, wherein one of the at least three common electrodes commonly connects one end of each of the alternately arranged lamps.

12. The backlight unit of claim 10, wherein the arranged lamps have at least one overlapped portion.

13. The backlight unit of claim 10, further comprising first, second, third supports mounting the lamps.

14. The backlight unit of claim 10, wherein the third common electrode has a portion located lower than an upper surface of the bottom support.

15. The backlight unit of claim 14, further comprising an insulating layer covering the portion of the third common electrode.

16. A backlight unit for a liquid crystal display device, comprising:
- a plurality of lamps alternately arranged on at least two regions of a light emission surface, wherein each lamp has a length substantially shorter than that of the light emission surface, and the lamps have first and second external electrodes at both ends; and
- at least three common electrodes connecting the first and second external electrodes of the lamps, wherein the at least three common electrodes include first and second common electrodes being applied with a first voltage, and a third common electrode being applied with a second voltage, and wherein the third common electrode has a portion located lower than an upper surface of a bottom support.

17. The backlight unit of claim 16, wherein the first and second voltages are different from each other.

18. A backlight unit for a liquid crystal display device, comprising:
- a plurality of lamps alternately arranged on at least two regions of a light emission surface, wherein each lamp has a length substantially shorter than that of the light emission surface;
- first, second, third, and fourth supports spaced apart from one another, wherein each support has a matching shape for receiving the lamps;
- a bottom support supporting the first, second, third, and fourth supports;
- first, second, third, and fourth common electrodes respectively attached on the first, second, third, and fourth supports, wherein the third and fourth common electrodes have portions located lower than an upper surface of the bottom support; and
- at least one power supply driving the lamps.

19. The backlight unit of claim 18, wherein the at least power supply includes first and second power supplies, the first power supply providing the first and third common electrodes with a voltage and the second power supply providing the second and fourth common electrodes with the voltage.

20. The backlight unit of claim 18, wherein the arranged lamps have at least one overlapped portion.

21. The backlight unit of claim 18, further comprising an insulating layer covering the portions of the third and fourth common electrodes.

22. The backlight unit of claim 18, further comprising first, second, third, and fourth supports receiving the lamps.

23. The backlight unit of claim 18, wherein the first and second common electrodes are applied with a first voltage, and the third and fourth common electrodes are applied with a second voltage.

24. The backlight unit of claim 23, wherein the first and second voltages are different from each other.

* * * * *